June 19, 1962   L. E. PODGER   3,039,551
ICE TRACTION WHEEL
Filed June 22, 1959   2 Sheets-Sheet 1
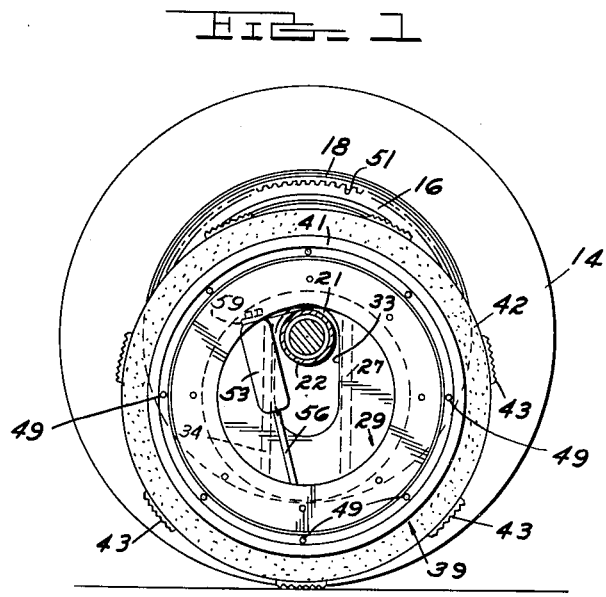
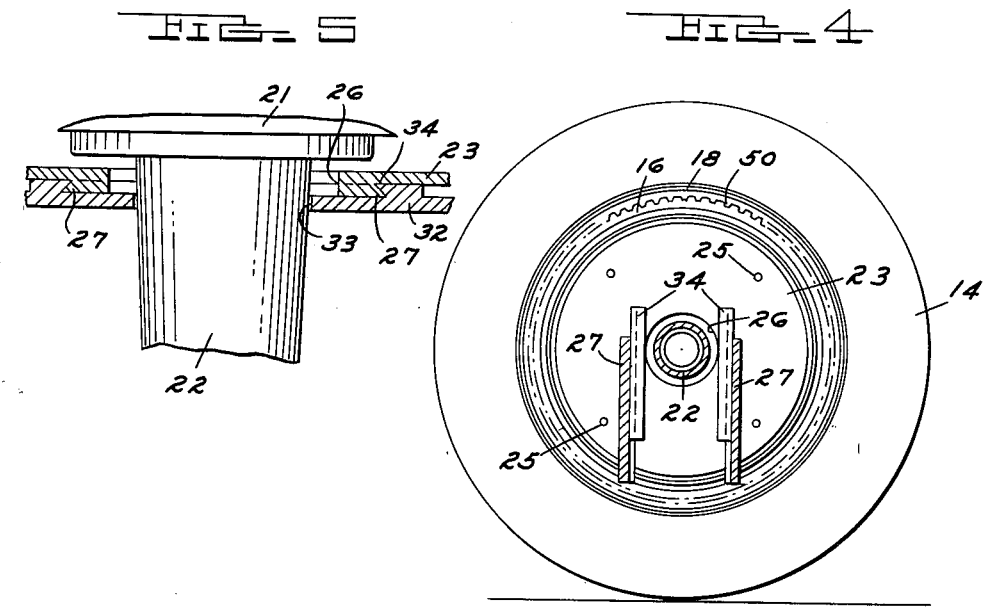
INVENTOR.
LAWRENCE E. PODGER
BY Whittemore, Hulbert
Belknap
ATTORNEYS June 19, 1962
L. E. PODGER
3,039,551
ICE TRACTION WHEEL
Filed June 22, 1959
2 Sheets-Sheet 2
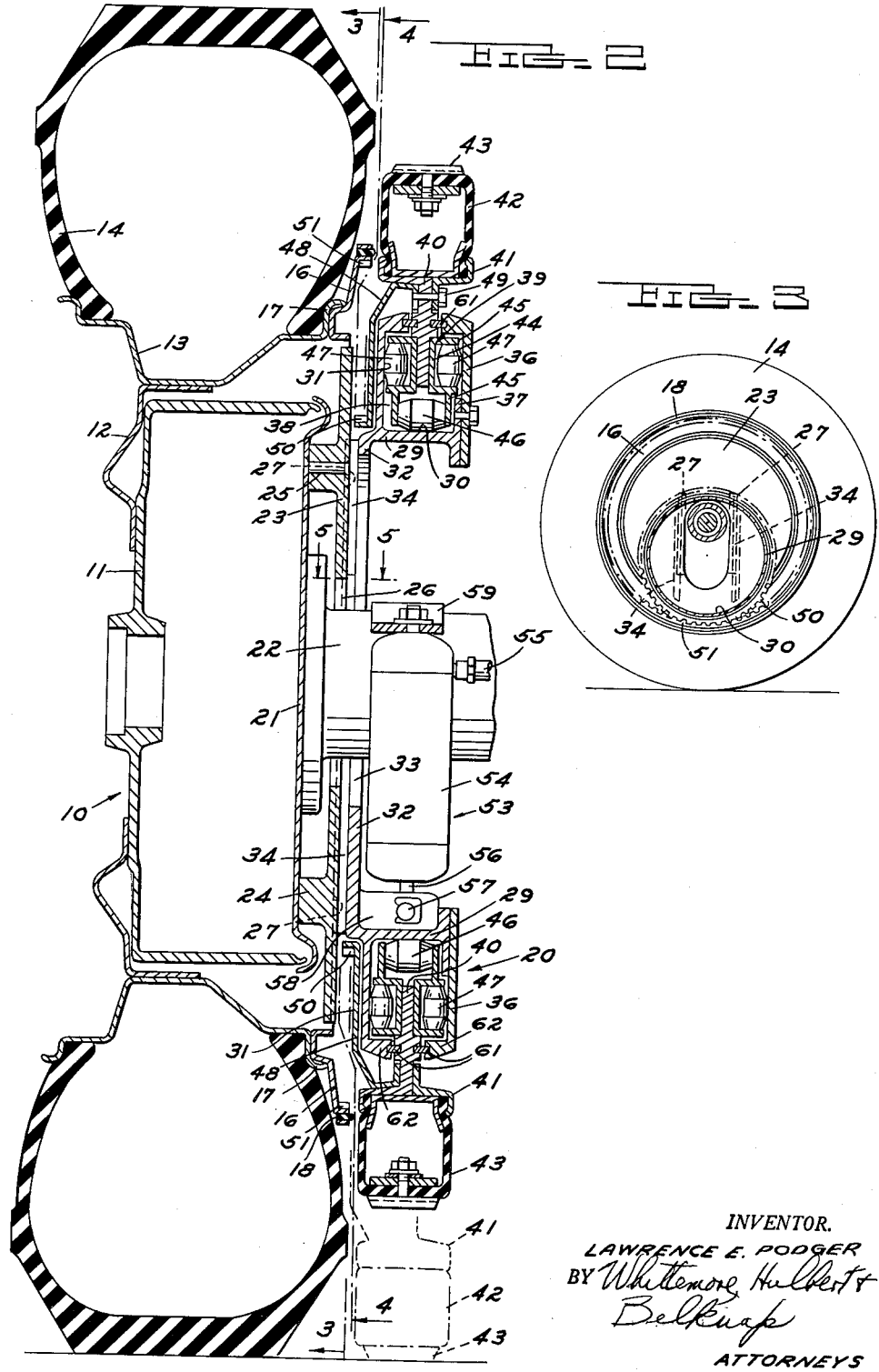
INVENTOR.
LAWRENCE E. PODGER
BY Whittemore, Hulbert &
Belknap
ATTORNEYS

United States Patent Office 3,039,551
Patented June 19, 1962

3,039,551
ICE TRACTION WHEEL
Lawrence E. Podger, 28530 Parkwood Drive,
Inkster, Mich.
Filed June 22, 1959, Ser. No. 821,950
6 Claims. (Cl. 180—15)

The present invention relates to improvements in an auxiliary wheel adapted to be applied to the driving wheel or wheels of an automobile or related type vehicle to augment the tractive effort of the latter under a condition of ground ice or other adverse condition having a similar effect.

It is an object of the invention to provide an auxiliary ice traction wheel for these purposes which is easily and quickly applied to the usual automotive drive wheel, as at the wheel axle, with a fixed mounting and guide member supported on a fixed portion of the existing wheel structure, such as the usual backing plate of the wheel brake, in which a fixed structure mounted in this fashion serves to guide an auxiliary wheel unit into and out of tractive engagement with a ground surface.

Another object is to provide an auxiliary traction wheel of this sort, comprising a circular guide ring or track normally mounted by the supporting structure referred to in coaxial relation to the conventional wheel and its axle, and shiftable to an eccentric position in which the circular guide ring or track so guided is eccentric of the wheel axle and in position so as to be internally tangent with the ground engaging surface of the existing wheel, in which last named position it engages the ground under positive drive from said existing wheel to augment the tractive effort of the latter.

Yet another object is to provide an ice traction or like wheel of the sort described, in which the guide ring or track has a plurality of circumferentially distributed, radially disposed spider arms mounted by anti-friction rollers for rolling engagement with said ring or track, these arms supporting an annular auxiliary wheel rim and tread for travel about the circular perimeter of the ring or track. In accordance wtih the invention, and with the auxiliary wheel unit shifted to the eccentric, ground engaging and traction position referred to, the auxiliary wheel has provision for toothed driving engagement with a toothed annular member rotating with the existing ground wheel, so that the auxiliary wheel is positively driven in unison with the last named wheel as they both engage the ground.

Another object of the invention is to provide an auxiliary traction wheel as described, in which the circular guide ring or track is positioned into and out of its eccentric relation to the existing wheel axle by automatic provisions applied to the wheel axle, in the form of a suitable, reversibly acting fluid pressure cylinder and plunger unit adapted to be controlled from a remote point in the driver's compartment.

A still further object is to provide an auxiliary wheel structure as described, in which provision is made to commence rotation of the auxiliary wheel prior to the time that it has driving engagement with the existing ground wheel, in the manner referred to, so that when such engagement is effected the auxiliary wheel is not subjected to a sudden and possibly destructive shock in torque. As actually embodied in the illustrated unit, such means takes the form of an annular friction member rotating with the existing ground wheel and engaged by the auxiliary wheel as the latter is shifted radially to its eccentric, ground-engaging position.

The foregoing as well as other objects will become more apparent as this description proceeds, especially when considered in connection with the accompanying drawings illustrating the invention, wherein:

FIG. 1 is an elevational view, as from a vertical plane inside of the upright plane of an automobile drive wheel (i.e. from the right of FIG. 2), showing the auxiliary traction wheel of the invention applied to the latter;

FIG. 2 is a view in enlarged scale and in a radial plane including the existing wheel axis, showing in solid and dotted line, respectively, the auxiliary wheel unit in its retracted coaxial or concentric and its advanced eccentric, ground-engaging positions;

FIGS. 3 and 4 are, respectively, more or less schematic views in vertical section transversely of the wheel axle, along lines corresponding to lines 3—3 and 4—4 of FIG. 2; and FIG. 5 is a fragmentary view in horizontal section along line 5—5 of FIG. 2.

First referring to FIG. 2 of the drawings, the reference numeral 10 generally designates an entirely conventional automotive wheel and brake assembly of an automobile or like vehicle, typically a rear drive wheel assembly of the same. This comprises a rotating brake drum 11 (a coacting brake shoe unit being omitted for simplicity), which drum carries an annular concentric ring 12 on which a conventional rim 13 is mounted, with a tire 14 applied to the rim. In accordance with the invention, and for a purpose hereinafter described, an annular ring 16 is suitably secured in fixed, concentric relation to the rim 13, as at a flanged formation 17 of the latter, and a friction ring 18 of continuous circular outline is mounted by the annular member 16, extending axially inwardly of the latter and toward the adjacent auxiliary traction wheel unit of the invention, which is generally designated by the reference numeral 20.

The wheel assembly 10 also includes the usual circular backing plate 21, suitably secured to the wheel axle housing 22, the plate 21 serving the usual function of mounting fixed brake shoe and other control parts (not shown).

In accordance with the invention, a suitably rigid mounting and guide plate 23, which may be of circular outline, as viewed parallel to the axle housing 22, is fixedly secured on the inner upright surface of brake backing plate 21, and to this end the mounting plate 23 may be provided with an annular boss 24 (or a series of individual bosses) projecting toward and engaging the backing plate 21, and rigidly secured thereto, as by rivets 25 or the like. Mounting plate 23 is centrally apertured at 26 to surround wheel axle housing 22; and (as illustrated in FIGS. 2 and 5, and more or less schematically shown in FIGS. 3 and 4) is formed to provide parallel, vertically extending undercut or dove tail type guide ways 27 on either side of the opening 26. These ways extend vertically at least from a point adjacent the upper edge of the plate 23 down closely adjacent or at the lower edge of plate 23.

The reference numeral 29 designates an annular guide ring or track of circular outline, providing a radially outwardly facing and axially extending circular track surface 30 of cylindrical cross section, on one side of which an annular wall flange 31, integral with guide ring 29, extends radially outwardly of the latter. Guide ring or track 29 also has an inner integral flange 32 extending in an upright plane intersecting at 90° the axis of wheel housing 22; and the flange 32 is provided with a vertically extending recess 33 accommodating wheel housing 22 and of height sufficient to enable the ring or track 29 to be shifted from its inoperative, retracted position coaxial of wheel and brake unit 10, shown in solid line position in FIG. 2, to its projected, eccentric and operative position, shown in dotted line in the same figure.

In order to guide the ring or track 29 in this movement, its flange 32 is provided, on opposite sides of its aperture or opening 33, with undercut or dovetail type ways 34 which mate with the ways 27 of the fixed mounting plate 23, as best shown in FIG. 5. The ways 34 may extend equidistantly in the vertical sense, being shown in FIG. 2 as terminating adjacent the cylindrical track portion 30 of the guide ring 29.

This ring is completed by an external annular flange member 36 paralleling its integral annular flange formation 31, and similarly extending radially outwardly, the member 36 being suitably secured to ring or track 29, as to a partial outer radial flange 37 integral with the latter. As thus constituted, there is defined by the cylindrical track portion or member 30 and the flange formations 31 and 36 an annular, axially and radially enclosed track space 38 in which a plurality of anti-friction arm units, generally designated 39, are received for guided rotation about the track ring 29.

There are preferably about seven of such units 39, equally spaced circumferentially about the periphery of ring or track 29, for a proper and desired distribution of radial stress on the latter. Each such unit is suitably secured to a continuous circular mounting ring 40 located in a plane intersecting at 90° the axle housing 22 and provided with an annular rim 41 in which an appropriate traction wheel 42 is suitably clamped; and such wheel is preferably provided with a series of segmental wear-resistant treads 43, for example, seven in number, about its outer periphery.

The guide units 39 are each comprised of a suitable mounting body or bracket 44 welded or otherwise fixedly applied to the radial web portion of ring 40, with integral flanges 45 of the bracket journalling anti-friction guide and track rollers 46, 47. As shown in FIG. 2, the rollers 46 of the respective units 39 are journalled on horizontal axes, while there is a pair of rollers 47 on either side of the mount 44 which are journalled on radially extending axes, thus to have rolling engagement with the radial flange formations 31, 36 of guide track or ring 29, with the rollers 46 in rolling, radial bearing engagement with the cylindrical track portion 30.

In order to prevent excessive and possible damaging shock when the auxiliary traction wheel unit 20 engages the ground, in the dotted line position thereof shown in FIG. 2, I secure an annular toothed gear ring 48 to the inner side of the wheel mounting ring 40 facing the mounting plate 23 and wheel and brake unit 10, as by riveting or bolting this gear ring 48 to the ring 40 at 49. The gear ring 48 extends radially inwardly and is provided at its inner extremity with gear teeth 50 which, when the auxiliary wheel unit 20 is in its lowered, dotted line position of FIG. 2, come into mesh with teeth 51 formed in a continuous circumferential series on the radially outer portion of the annular member 16, on which the friction ring 18 is carried. However, prior to the coming of the wheel tread 43 into ground engagement, the adjacent surface of the gear ring 48 has frictional engagement with the friction ring 18, thus setting the traction wheel 42 and its tread 43 in rotation at the same speed as the main wheel unit 10, so that as ground engagement is completed, the auxiliary traction wheel and main wheel are rotating in unison.

An operating unit for the auxiliary wheel is generally designated by the reference numeral 53. This unit comprises an appropriate operating motor or equivalent device 54, such as a pneumatic or hydraulic cylinder and plunger, a solenoid actuated device, and the like, adapted to be reversibly operated, as through a connecting fitting 55, from within the driver's compartment of a vehicle. The plunger 56 of the device 54 is suitably connected at 57 to a rib or flange 58 integral with the guide track member 29; and the opposite end of the device is appropriately connected rigidly, for example, by a suitable saddle strap 59 or equivalent mount, to the wheel axle housing 22.

When it is desired to operate the auxiliary unit 20 to obtain increased ground or road traction, the driver manipulates a suitable control to actuate the motor unit 53 in a manner to exert downward radial thrust on the guide ring or track 29. As guided by the coacting ways 27, 32 (FIG. 5), the track carries the traction wheel 42 downwardly from the retracted position coaxial with the wheel and brake unit 10, shown in solid line in FIG. 2, to the ground-engaging, dotted line position; and in reaching this last mentioned position the wheel 42 is set in motion by the frictional engagement of friction ring 18 with its gear ring 48. Upon engagement of the gear teeth 50 on ring 48 with the teeth 51 on the friction ring 18, the auxiliary wheel 42 becomes positively driven with the main wheel and brake unit 10 to exert desired positive tractive effort. When such effort has been utilized for the desired period, the motor unit 53 is reversed, or the application of power thereto is discontinued, whereupon the auxiliary wheel 42 is returned to its retracted position, shown in solid line in FIG. 2. It has not been deemed necessary to illustrate structural features of the motor unit 53, which may be, for example, a double acting plunger type, a plunger and spring type, or the like.

The roller-type anti-friction spider arm units 39 transmit the thrust exerted by motor unit 53, while guiding the traction wheel 42 with minimum frictional loss in its path internally tangent to and on one side of the rotative path of the tire 14. If desired, the guiding action may be augmented, and the internal track space 38 sealed against entry of foreign matter by means of sealing ring elements 61 interposed between the mounting ring 40 of the respective units 39 and inwardly directed flange extensions 62 on the respective flange formations 31 and 36 of the guide ring or track 29, ring 40 sliding between the elements.

The auxiliary traction wheel of the invention is rugged, both as to the construction of its parts and as to its provisions for causing a drive of the wheel 42 in unison with the main wheel unit 10. While it is contemplated that it will be put to only periodic use in emergencies, these characteristics and its reliability in operation enable it to be employed over more extended periods of operation, as in traversing difficult or hilly terrain.

What I claim as my invention is:

1. An auxiliary traction wheel for coaction with a ground wheel and its associated fixed structure, comprising a circular guide having means to mount the same for a linear adjusting movement on said fixed structure in a plane adjacent to and paralleling said ground wheel, means mounted on said fixed structure and operatively connected to said guide to actuate the same for said adjustment, and a circumferentially extending traction structure mounted by said guide for concentric movement thereabout as guided and radially sustained by said guide, said traction structure being moved by said guide when the latter is actuated to a position in substantially tangent, operative and side by side ground-engaging relation to said ground wheel, means drivingly coupling said traction structure for rotation with said ground wheel in said last named position of the traction structure, including means rotating with the ground wheel and frictionally and slidingly engaging the traction structure in being so coupled to initiate rotation of the traction structure, said mounting means for said traction structure comprising a plurality of circumferentially spaced anti-friction devices between said guide and said traction structure to guide the latter for coaxial rotation about said guide, and means providing a substantially enclosed annular track space in which said devices are received to shield the same from the exterior.

2. An auxiliary traction wheel for coaction with a ground wheel and its associated fixed structure, comprising a circular guide having means to mount the same for a linear adjusting movement on said fixed structure in a plane adjacent to and paralleling said ground wheel, means mounted on said fixed structure and operatively connected to said guide to actuate the same for said adjustment, and a circumferentially extending traction structure mounted by said guide for concentric movement thereabout as guided and radially sustained by said guide, said traction structure being moved by said guide when the latter is actuated to a position in substantially tangent, operative and side by side ground-engaging relation to said ground wheel, said mounting means for said traction structure comprising a plurality of circumferentially spaced anti-friction devices between said guide and said traction structure to guide the latter for coaxial rotation about said guide, and means providing a substantially enclosed annular track space in which said devices are received to shield the same from the exterior, said traction structure having means to drivingly couple the same to said ground wheel in its operative position and means on said guide frictionally engaging said ground wheel as the guide approaches said operative position to initiate rotation of the guide with the ground wheel prior to being so coupled.

3. An auxiliary traction wheel for coaction with a ground wheel and its associated fixed structure, comprising a circular guide having means to mount the same for a linear adjusting movement on said fixed structure in a plane adjacent to and paralleling said ground wheel, means mounted on said fixed structure and operatively connected to said guide to actuate the same for said adjustment, a circumferentially extending traction structure mounted by said guide for concentric movement thereabout as guided and radially sustained by said guide, said traction structure being moved by said guide when the latter is actuated to a position in substantially tangent, operative and side by side ground-engaging relation to said ground wheel, said mounting means for said traction structure comprising a plurality of circumferentially spaced anti-friction devices between said guide and said traction structure to guide the latter for coaxial rotation about said guide, and means providing a substantially enclosed annular track space in which said devices are received to shield the same from the exterior, said anti-friction devices each comprising axially and radially journaled rotatable elements in rolling engagement with said track space means, said traction structure having means to drivingly couple the same to said ground wheel in its operative position, and means to impart rotation to said traction structure in being so coupled.

4. An auxiliary traction wheel for coaction with a ground wheel and its associated fixed structure, comprising a circular guide having means to mount the same for a linear adjusting movement on said fixed structure in a plane adjacent to and paralleling said ground wheel, means mounted on said fixed structure and operatively connected to said guide to actuate the same for said adjustment, a circumferentially extending traction structure in the form of a traction wheel mounted by said guide for concentric movement thereabout as guided and radially sustained by said guide, said traction wheel being moved by said guide when the latter is actuated to a position in substantially tangent, operative and side by side ground-engaging relation to said ground wheel, said mounting means for said traction structure comprising a plurality of circumferentially spaced anti-friction devices between said guide and said wheel of said traction structure to guide the latter for coaxial rotation about said guide, and means providing a substantially enclosed annular track space in which said devices are received to shield the same from the exterior, said anti-friction devices each comprising axially and radially journaled rotatable elements in rolling engagement with said track space means, said traction wheel of said structure having means to drivingly couple the same to said ground wheel in its operative position, and means to impart rotation to said traction wheel in being so coupled.

5. An auxiliary traction wheel for coaction with a ground wheel and its associated fixed structure, comprising a circular guide having means to mount the same for a linear adjusting movement on said fixed structure in a plane adjacent to and paralleling said ground wheel, means mounted on said fixed structure and operatively connected to said guide to actuate the same for said adjustment, and a circumferentially extending traction structure mounted by said guide for concentric movement thereabout as guided and radially sustained by said guide, said traction structure being moved by said guide when the latter is actuated to a position in substantially tangent, operative and side by side ground-engaging relation to said ground wheel, said mounting means for said traction structure comprising a plurality of circumferentially spaced anti-friction devices between said guide and said traction structure to guide the latter for coaxial rotation about said guide, and means providing a substantially enclosed annular track space in which said devices are received to shield the same from the exterior, said anti-friction devices each comprising axially and radially journaled rotatable elements in rolling engagement with said track space means, said traction structure having means to drivingly couple the same to said ground wheel in its operative position, including means frictionally and slidingly engaged by said ground wheel in being so coupled to initiate rotation of said traction structure with the ground wheel.

6. An auxiliary traction wheel for coaction with a ground wheel and its associated fixed structure, comprising a circular guide having means to mount the same for a linear adjusting movement on said fixed structure in a plane adjacent to and paralleling said ground wheel, means mounted on said fixed structure and operatively connected to said guide to actuate the same for said adjustment, a circumferentially extending traction structure mounted by said guide for concentric movement thereabout as guided and radially sustained by said guide, said traction structure being moved by said guide when the latter is actuated to a position in substantially tangent, operative and side by side ground-engaging relation to said ground wheel, said mounting means for said traction structure comprising a plurality of circumferentially spaced anti-friction devices between said guide and said traction structure to guide the latter for coaxial rotation about said guide, means providing a substantially enclosed annular track space in which said devices are received to shield the same from the exterior, said anti-friction devices each comprising axially and radially journaled rotatable elements in rolling engagement with said track space means, said traction structure having means to drivingly couple the same to said ground wheel in its operative position, and means on said guide frictionally engaging said ground wheel as the guide approaches said operative position to initiate rotation of the guide with the ground wheel prior to being so coupled.

References Cited in the file of this patent

UNITED STATES PATENTS

| 471,711 | Ames et al. | Mar. 29, 1892 |
| 2,273,663 | Robert | Feb. 17, 1942 |

FOREIGN PATENTS

| 48,267 | Denmark | Jan. 15, 1934 |